(12) United States Patent
Ramsey et al.

(10) Patent No.: US 8,423,434 B2
(45) Date of Patent: Apr. 16, 2013

(54) TAX RETURN EVALUATION SYSTEM

(75) Inventors: Douglas T. Ramsey, Hartford, CT (US); Maran J. Parker, Colchester, CT (US); Martin J. Grabeck, West Hartford, CT (US); John Christian Stauffer, Chevy Chase, MD (US)

(73) Assignee: Accenture Global Services Limited, Dublin (IE)

( * ) Notice: Subject to any disclaimer, the term of this patent is extended or adjusted under 35 U.S.C. 154(b) by 0 days.

(21) Appl. No.: 13/424,021

(22) Filed: Mar. 19, 2012

(65) Prior Publication Data

US 2012/0226591 A1 Sep. 6, 2012

Related U.S. Application Data

(63) Continuation of application No. 12/494,966, filed on Jun. 30, 2009, now Pat. No. 8,140,413.

(51) Int. Cl.
*G06F 17/22* (2006.01)
*G07F 19/00* (2006.01)

(52) U.S. Cl.
USPC .............................. 705/31; 705/7.28; 705/19

(58) Field of Classification Search ................... None
See application file for complete search history.

(56) References Cited

U.S. PATENT DOCUMENTS

2009/0234684 A1* 9/2009 Stoke et al. .................... 705/7

OTHER PUBLICATIONS

Who the IRS Audits by Irvin L. BLackman—published Feb. 1982.*

* cited by examiner

*Primary Examiner* — Luna Champagne
(74) *Attorney, Agent, or Firm* — Mannava & Kang, P.C.

(57) ABSTRACT

Tax returns are received from one or more tax agencies. Each tax return is compared to a stored profile, and a determination is made as to whether each tax return falls within a trend. An evaluation of the tax return is generated based on the comparison and the determination of whether the tax return falls within the trend. The evaluation includes an indication of the tax returns potential to be a fraudulent tax return.

18 Claims, 4 Drawing Sheets

TAX RETURN EVALUATION SYSTEM

BACKGROUND

Tax returns are filed from several sources, including through the a federal or state electronic filing program, directly from taxpayers via tax preparation software or paper-based returns, or bulk-filing from tax preparers and data-entry vendors. The government tax agency handling the filings, such as the Internal Revenue Service (IRS) or state revenue departments, typically enters the information from the tax returns for each filer into their internal database, and then human auditors may review the data to identify fraudulent or inaccurate returns.

The conventional auditing process, however, provides little collaboration or validation from other tax agencies and data sources, and as a result is less likely to capture multi-state tax fraud campaigns. For example, a person may attempt to defraud multiple states by filing tax returns in ten different states under a social security number for a deceased person. Self-contained systems of each state agency are not able to identify that refunds are being requested under the same social security number for multiple different states, and may be unable to connect with any databases that store information about the deceased. Furthermore, this type of fraud may not be captured by the traditional auditing process, if none of the flags are triggered. For example, if the fraudulent returns are each claiming a modest refund, e.g., $1500.00 or less, the returns may fall below a threshold that triggers a flag for an audit, and the refunds may be paid.

BRIEF DESCRIPTION OF DRAWINGS

The embodiments of the invention will be described in detail in the following description with reference to the following figures.

DETAILED DESCRIPTION OF EMBODIMENTS

Figure 1:
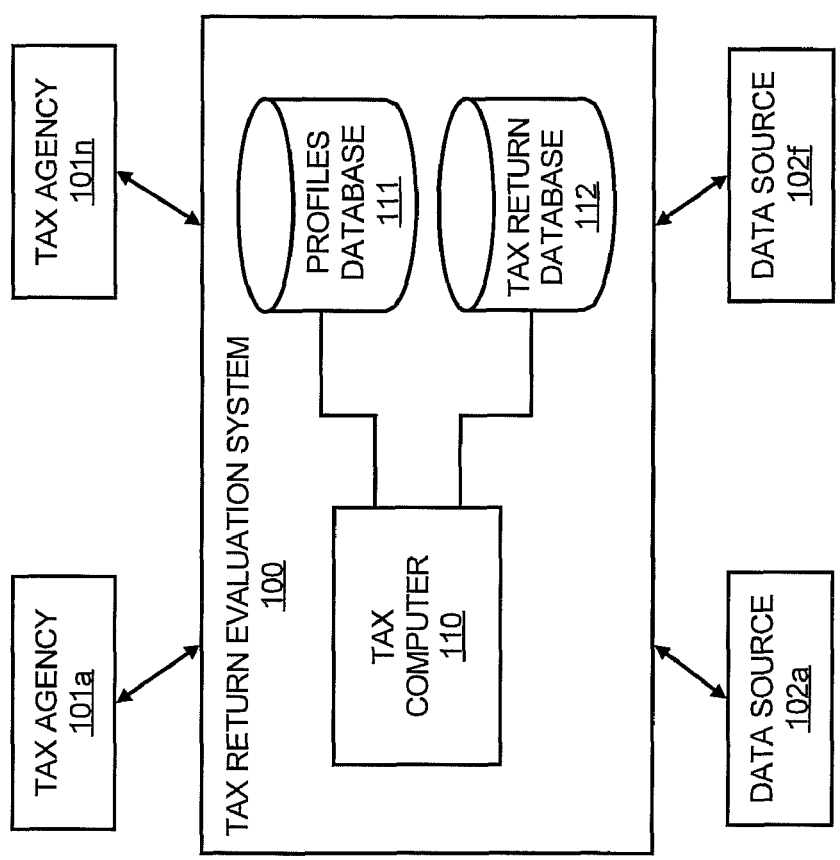
FIG. 1 illustrates a tax return evaluation system, according to an embodiment.

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

1. Overview

According to an embodiment, a tax return evaluation system identifies potential taxpayer fraud by examining data fields in filed taxpayer returns. Examples of the data fields include social security number, address, refund requested, withholding, employer ID, tax prepare ID, bank account information, adjusted gross income (AGI), etc. The data fields or information derived from the data fields (e.g., ratio of refund to AGI) are compared to profiles and information from multiple data sources to identify potentially fraudulent returns. The profiles are custom in that they can be created and provided by tax agencies or other entities requesting evaluation by the tax return evaluation system. For their profiles, each tax agency can pick the data fields and values for the data fields, which may be thresholds, that are considered flags for detecting fraudulent returns. The data fields in the profiles are referred to as factors. Furthermore, an agency may have more than one profile for detecting different types of fraud or incorrect returns.

In one embodiment, the tax return evaluation system is a central system that is connected to the data sources and is configured to receive and store the profiles from each tax agency. The data sources may include public databases or other public data sources, collaborating government agencies, or an internal data source compiling information from tax returns from multiple tax agencies. Examples of the data in the data sources include an invalid social security number database, deceased information database, criminal warrants and liens database, property assessments database, and known fraudulent tax preparers and filers. The tax return evaluation system receives the tax returns from the tax agencies and uses the custom profiles and information from the data sources for fraud detection. The tax return evaluation system may use a service-oriented architecture, and may be provided in the form of a web-based application supported by a relational database management system. In other embodiments, some or all of the functionality of the tax return evaluation system can be provided as part of a system for a particular tax agency, such as incorporated with the IRS's current tax system or incorporated in a state tax system. The tax agency may be a government agency responsible for collecting taxes.

According to an embodiment, the tax return evaluation system performs a trend analysis to identify factors that are associated with potentially fraudulent returns. The trend analysis may encompass an intra-trend analysis that analyzes factors within a single return and an inter-trend analysis that analyzes factors across multiple tax returns, which may include returns from multiple states and the IRS.

Also, a scoring function may be applied to score each tax return based on a comparison to one or more profiles, which may be the custom profiles provided by the tax agency or trend analysis profiles. A score is generated for each return and is used to determine whether the return is fraudulent. Also, the trend analysis can impact the score if a determination is made that the return falls within a trend of potentially fraudulent returns.

2. System Diagram

FIG. 1 illustrates a tax return evaluation system 100, according to an embodiment. The tax return evaluation system 100 includes a tax computer 110, a profiles database 111, and a tax return database 112. The tax evaluation system 100 may include other well known components. The tax computer 110 includes one or more computer systems for evaluating tax returns. The profiles database 111 stores profiles, which may be received from tax agencies 101a-n or other entities. The tax return database 112 stores received tax returns to be evaluated. The tax agencies 101a-n may include state tax agencies, and/or the IRS. The tax return evaluation system 100 is also connected to data sources 102a-f. These are data sources that provide information that can be used for evaluating tax returns for fraud. The data sources 102a-f may be publically available data sources, private data sources or government data sources.

The tax return evaluation system 100 receives tax returns from the tax agencies 101a-n. For example, the tax agencies 101a-n collect the tax returns from their tax payers and send the returns to the tax return evaluation system 100.

The tax returns may be sent in batch jobs or in real-time, as they are received by the tax agencies 101a-n. The tax return database 112 stores the received tax returns.

The tax return evaluation system 100 evaluates each tax return for fraud using the stored profiles in the profile database 111. The stored profiles include factors for evaluating tax returns. The factors are associated with data fields in a tax return. Examples of the factors and data fields are social security number, tax payer ID, address, any banking information, tax preparer ID/name/address, refund amount, AGI, withholding amount; whether the filer is a first time filer, whether the address is out-of-state and from a non-contiguous state, whether refunds were previously requested by the filer and how much, etc.

The factors have associated values in the profile. The values may be values for the factors. For example, a profile may want to evaluate non-contiguous, out-of-state filers that request refunds between $1500.00 and $3000.00. The range between $1500.00 and $3000.00 are values for the refund amount factor. Non-contiguous and out-of-state are values for a factor consisting of address of the filer.

The tax computer 110 uses a profile for a tax agency to identify fraud for tax returns from the jurisdiction of the agency. The profile may be retrieved from the profiles database 111. For example, values from the data fields in each tax return are extracted. These values are compared to values in the profile, such as the range between $1500.00 and $3000.00 for refund amount, and non-contiguous and out-of-state for address. If values from a tax return match the values in the profile, then an evaluation of the return for fraud is generated. An example of a match is if the tax return includes a refund amount data field value of $2000.00, because it is in the range between $1500.00 and $3000.00 specified for the refund amount factor in the profile. A data field from a tax return that is compared to a factor in a profile for matching is referred to as a corresponding data field for the factor. Also, if a value of a corresponding data field satisfies the value of its factor, such as the example where the data field value falls within the range for the factor, the factor and corresponding data field are described as matching.

An evaluation is generated for the return that indicates the likelihood or probability that the return is fraudulent. The evaluation varies depending on multiple criteria, which may include number of matches, the type of matching factors, trends, and others. Also, values from the tax return are compared to information from the data sources 102a-f. Matches between the values from the tax return and the information from the data sources 102a-f impact the evaluation of the tax return. For example, if the data source 102a includes social security numbers for deceased individuals, and the social security number from the tax return matches a social security number from the data source 102a, then the tax return may be marked as fraudulent. In another example, the data source 102b includes information for people previously convicted for fraud. A match between the data source 102b and a tax return impacts the evaluation to indicate a greater likelihood of fraud.

Trends are also detected using the profiles. In one example, a trend is identified if multiple values for factors in the profile match values in data fields in a tax return. If a trend is detected, the trend impacts the evaluation of the tax return, for example, by indicating an increased likelihood of fraud. Other types of trends that are associated with factors across multiple tax returns may also be detected, and trend profiles are created for these types of trends.

As indicated above, the evaluation of a tax return indicates a probability or likelihood of fraud. The evaluation is not necessarily a "yes" or "no" answer of whether a tax return is fraudulent, and may indicate the degree of likelihood of fraud. In one embodiment, scoring is used to determine the evaluation of the tax return and to indicate the degree of likelihood of fraud. A score is generated by the tax return evaluation system that indicates the likelihood the tax return is fraud. In one example, the score is between 1 and 100, where 100 is the highest likelihood of fraud. Other scoring ranges may alternatively be used. A trend multiplier is used to change the score if a trend is detected. Other criteria also impact the score. Examples of the scoring are described in further detail below.

As described above, the tax return evaluation system 100 uses profiles to evaluate tax returns for fraud. However, the tax return evaluation system 100 maybe used to evaluate tax returns to achieve other objectives. For example, fraud typically includes intentional misrepresentation in the tax return. The tax return evaluation system may be used to identify unintentional misreporting in tax returns using profiles. Furthermore, the profiles may be used to identify tax returns for auditing. For example, if a tax return matches multiple factors in a profile, the tax return is flagged for further auditing by the tax agency.

In one embodiment, the tax return evaluation system 100 is a service that is accessed via the Internet. For example, each of the tax agencies 101a-n uploads tax returns to the tax return evaluation system 100 via a web interface, and the tax returns are stored in the tax return database 112. The tax return evaluation system 100 evaluates each return and sends the evaluations to the tax agencies 101a-n or makes the evaluations available to the tax agencies 101a-n for downloading via the web interface. In this embodiment, the tax return evaluation system operates as a central, remote system that is accessible via the Internet or other private or public networks. Also, the tax return evaluation system 100 is able to capture information from tax agencies, which can be used to identify trends across multiple jurisdictions.

Because of data sensitivity issues, the tax agencies 101a-n may not send entire tax returns. For example, instead of receiving and storing entire tax returns, the tax return evaluation system 100 may only receive predetermined line items from each return, and store those line items in the tax return database 112. These line items are then compared to one or more stored profiles to evaluate each return.

In another embodiment, the tax return evaluation system 100 is incorporated in a local tax computer system of the tax agency. In this embodiment, the tax return evaluation system 100 may not have the benefit of accessing tax return data from other jurisdictions. However, in this embodiment, the system may be more secure in that data from tax returns that is sent to the tax return evaluation system 100 remains internal to the same system that receives the tax returns from the tax payers, and is not provided or stored with tax payer information from other jurisdictions. However, data storage policies may be instituted for the central tax return evaluation system embodiment to maintain confidentiality and to keep data from different jurisdictions separated as needed. Furthermore, in the embodiment where the tax return evaluation system 100 operates as a central, remote system, secure communication between the tax return evaluation system 100 and the tax agencies 101a-n and the data sources 101a-f as needed may be provided through conventional techniques, such as Secure Sockets Layer (SSL).

3. Scoring Examples

The tax return evaluation system 100 is operable to generate an evaluation for each tax return that indicates a likelihood of fraud. In one embodiment, scoring is used to generate the evaluation. Scoring may be based on multiple criteria, such as the number of matches found between data fields (e.g., line items) in the tax return and factors in a profile, matches between the data fields and information from the data sources 102a-f, the types of matches identified, where type is associated with the type of factor or data source that has a match, and weights for the types of matches. The evaluation of a tax return may be a report including a score and all the pertinent matching information.

In an example, suppose the tax agency 101a wants to identify fraud schemes from out-of-state filers. The tax agency 101a sends a profile 200 to the tax return evaluation system 100. The profile 200 includes the following factors and associated values shown in table 1.

TABLE 1 for Profile 200

| Factor | Value |
|---|---|
| address | out-of-state, non-contiguous |
| refund amount | $1,500.00-$3,000.00 |
| tax preparer | ABC tax preparers (same tax preparer as other returns with matching factors) |

The profile 200 has three factors including address of the tax payer, refund amount, and tax preparer. The values for each factor are also shown. The profile 200 may also specify weights for each value of a factor, which is used to calculate a score. For example, for address, a score of 10 is given if the address in a tax return is out-of-state but is in a contiguous state. If the address is both out-of-state but and in a non-contiguous state, the profile may specify a higher weight. For example, a score of 30 is given if both values are matched. If the refund amount in the tax return falls within the range of $1,500.00-$3,000.00, then a score of 25 is given for that factor based on the assigned weighting for that factor. As multiple tax returns are evaluated, the tax return evaluation system 100 is able to identify tax preparers filing tax returns that match the address and refund amount factors. If the tax return being evaluated has one of these tax preparers (e.g., ABC tax preparers) as its tax preparer then a score of 35 is given. The scores for each factor are accumulated to determine a final score for the tax return. The final score along with all the pertinent matching information is reported to the tax agency 101a.

The final score is also changed based on whether a trend is identified when evaluating a return. The trend multiplier is an amount that is multiplied by a score to account for an identified trend. The profile may specify the trend multiplier. The trend multiplier may be applied to the accumulated score to determine the final score. For example, a trend is identified for a tax return if multiple data fields match the factors in the profile. If the tax return has an address that is out-of-state and has a refund amount of $1,500.00 then the tax return has multiple matches. If the trend multiplier is 1.3, then 1.3 is multiplied by the accumulated score of 35 to determine the final score of 45.5. In other examples, the trend multiplier may be applied only to the scores that are for the matching factors. Also, the trend may be defined as multiple matching factors, or a majority of the factors are matched by the data fields in the tax return, or all the factors in the profile are matched by the data fields in the tax return.

Other criteria may influence the score. Information from the data sources 102a-f that matches data fields in the tax return may cause the score to be increased. For example, if the data source 102a includes social security numbers for deceased individuals, and the social security number from the tax return matches a social security number from the data source 102a, then the tax return may be given a maximum score. In another example, the tax return evaluation system 100 may compile information for fraudulent returns and use the information to generate profiles. Scores for tax returns matching these profiles are increased.

The profiles may be updated based to detect new fraud schemes and other incorrect tax returns. Thus, the tax return evaluation system 100 allows for dynamic evaluation of tax returns that allows the factors and weighting of the factors to be modified as needed.

4. Flowcharts

Figure 2:
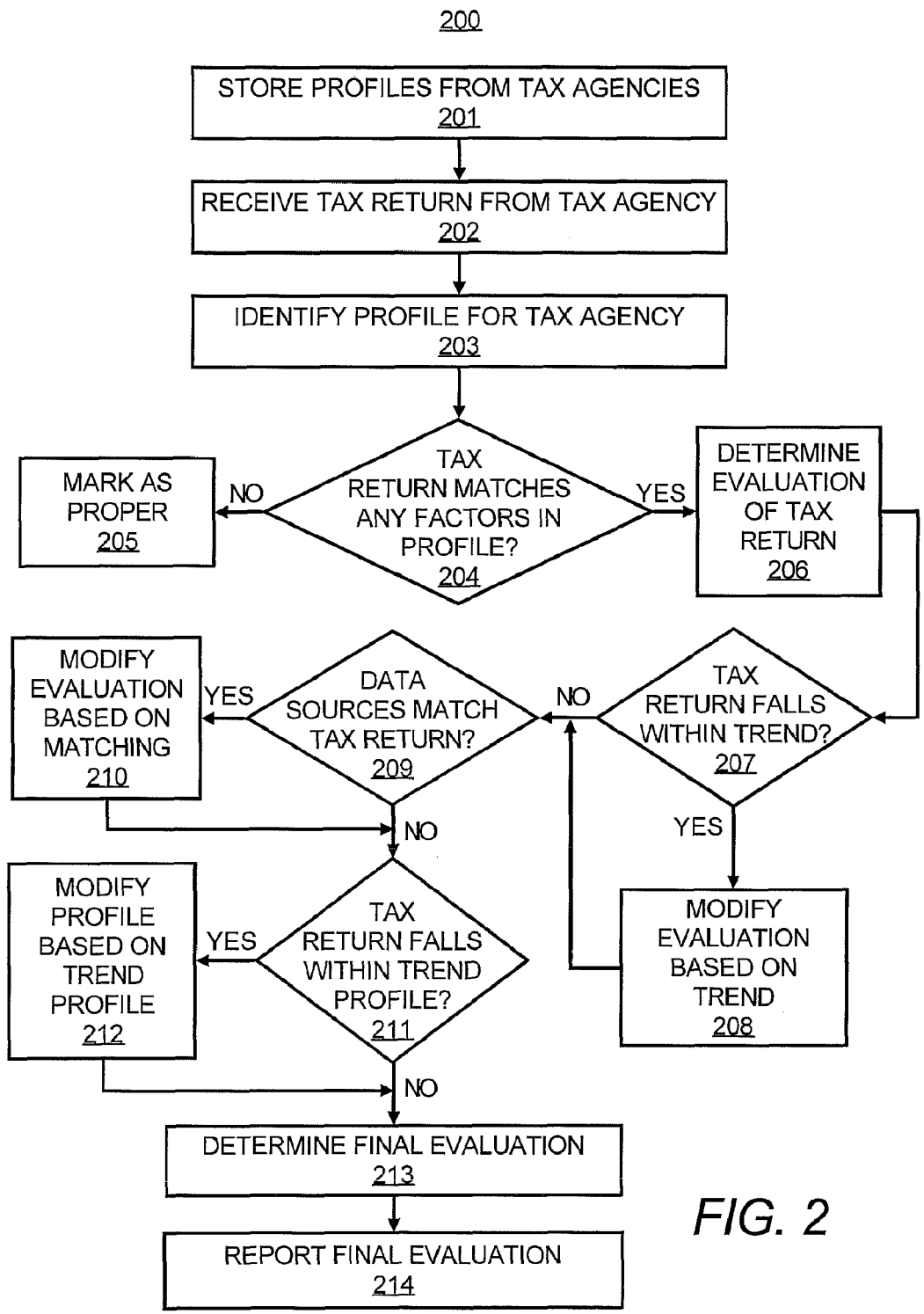
FIG. 2 illustrates a method for evaluating tax returns, according to an embodiment.

FIG. 2 illustrates a flowchart 200 for evaluating a tax return, according to an embodiment. The methods described herein may be described with respect to the tax return evaluation system 100 shown in FIG. 1 by way of example and not limitation. The methods may be practiced in other systems. Also, some of the steps of the methods may be performed in different orders than shown.

At step 201, profiles are received from the tax agencies 101a-n and stored in the profiles database 111.

At step 202, a tax return is received from a tax agency, such as the tax agency 101a. Instead of receiving an entire tax return, a plurality of line items (i.e., data fields) from the tax return is received. The tax return may be provided in batch job with several other returns or in real time as it is received by the tax agency.

At step 203, a profile for the tax agency 101a is identified. For example, a profile for the tax agency 101a is retrieved from the profiles database 111. A tax agency may have multiple profiles. In that case, the steps for evaluating the profile against the return is performed for each of the profiles.

At step 204, the tax return evaluation system 100 compares the tax return to the profile. The tax return evaluation system 100 determines whether any of the received data fields in the tax return match the factors in the profile. If no, then the tax return is marked as proper or not fraudulent at step 205. If yes, then, at step 206, an evaluation of the tax return is generated that includes an estimation of the likelihood the tax return is fraudulent and is based on the matching factors. This estimation may be an intermediate evaluation that is modified before a final evaluation is determined. For example, a score is determined for each matching factor. Also, weightings for the factors may be used to determine the scores. The scores for the factors are intermediate evaluations for the tax return.

At step 207, the tax return evaluation system 100 determines whether the tax return falls within a trend based on the comparison of the tax return to the factors in the profile. The trend may be defined as multiple factors in the profile matching data fields in the tax return, or a majority of the factors matching data fields in the tax return, or all the factors matching data fields in the tax return. The tax return is determined to fall within the trend if multiple factors in the profile match data fields in the tax return, or if a majority of the profiles are matched, or if all the profiles are matched, depending on how the trend is defined.

At step 208, if the tax return falls within the trend, then one or more evaluations determined at step 206 are modified to take into consideration the trend. For example, a trend multiplier is used to modify an accumulated score calculated from the scores for each matching factor.

At step 209, the tax return evaluation system 100 determines whether information from one or more of the data sources 102a-f matches the tax return. If yes, then, at step 210, the evaluation of the tax return, such as determined by the previous steps, is modified to take into consideration the matching. This may include increasing the score by a predetermined amount or a predetermined multiple.

At step 211, the tax return evaluation system 100 determines whether the tax return falls within a trend profile. For example, the tax return evaluation system 100 may generate trend profiles based on information from previous returns that were considered highly likely to be fraudulent. The tax return evaluation system 100 compiles the factors that are common to those profiles to generate a trend profile. If the tax return falls within the trend profile, then, at step 212, the evaluation of the tax return, such as determined by the previous steps, is modified to take into consideration the trend. This may include using a trend multiplier or other predetermined value to modify the score.

At step 213, a final evaluation is determined. This may include a score determined based on the previous steps. At step 214, the final evaluation is reported to the tax agency 101a, and may include the final score and any pertinent matching information.

The steps of the method 200 are repeated to evaluate each return. It should be noted that in some embodiments, some of the steps may be optional. For example, a tax return may not be evaluated against a trend profile at step 211, or if information is not available from the data sources 102a-f, then step 209 is not performed.

Figure 3:
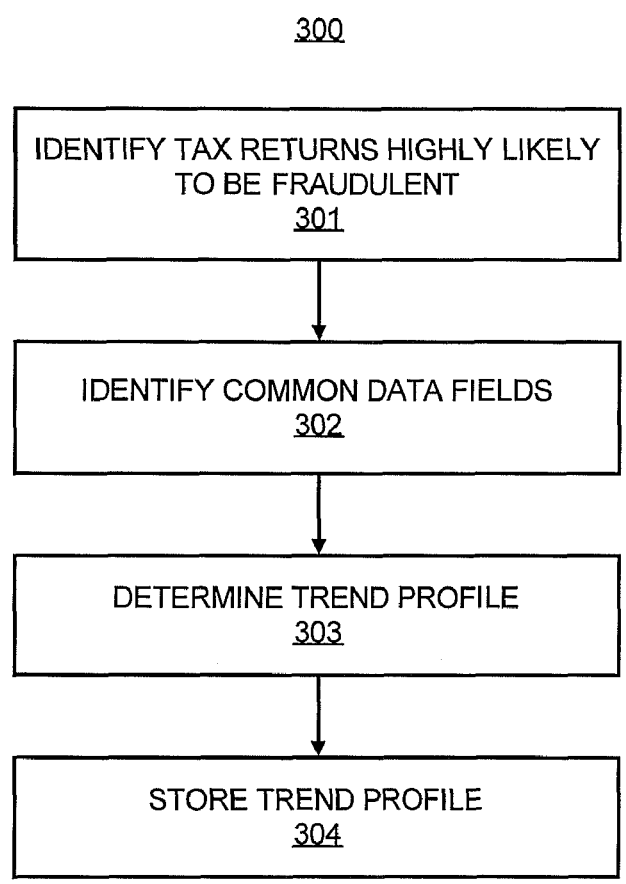
FIG. 3 illustrates a method for determining a trend profile, according to an embodiment.

FIG. 3 illustrates a method 300 for determining a trend profile, according to an embodiment. As described with respect to step 211, the tax return evaluation system 100 determines whether the tax return falls within a trend profile. The tax return evaluation system 100 may generate the trend profile based on information from previous returns that were considered highly likely to be fraudulent.

At step 301, the tax return evaluation system 100 identifies tax returns highly likely to be fraudulent. This may include tax returns having a score greater than a threshold. Tax returns from multiple tax agencies may be identified.

At step 302, common data fields from the tax returns identified at step 301 are determined. At step 303, a trend profile is determined from the common data fields. For example, the tax return evaluation system 100 determines that many tax returns from non-contiguous, out-of-state filers having the same tax preparer are highly likely to be fraudulent. The data fields of address and tax preparer and the values for the fields comprising non-contiguous, out-of-state filers and the name of the tax preparer that is the same for the tax returns become the factors and corresponding values for the factors in the trend profile.

At step 304, the trend profile is stored in the profiles database 111. A trend profile may be applicable for particular returns. For example, a trend profile may be compiled from tax returns from a particular region, such as states in the northeast, and the trend profile is only applied to tax returns from that region.

5. Computer Diagram and Computer Readable Medium

Figure 4:
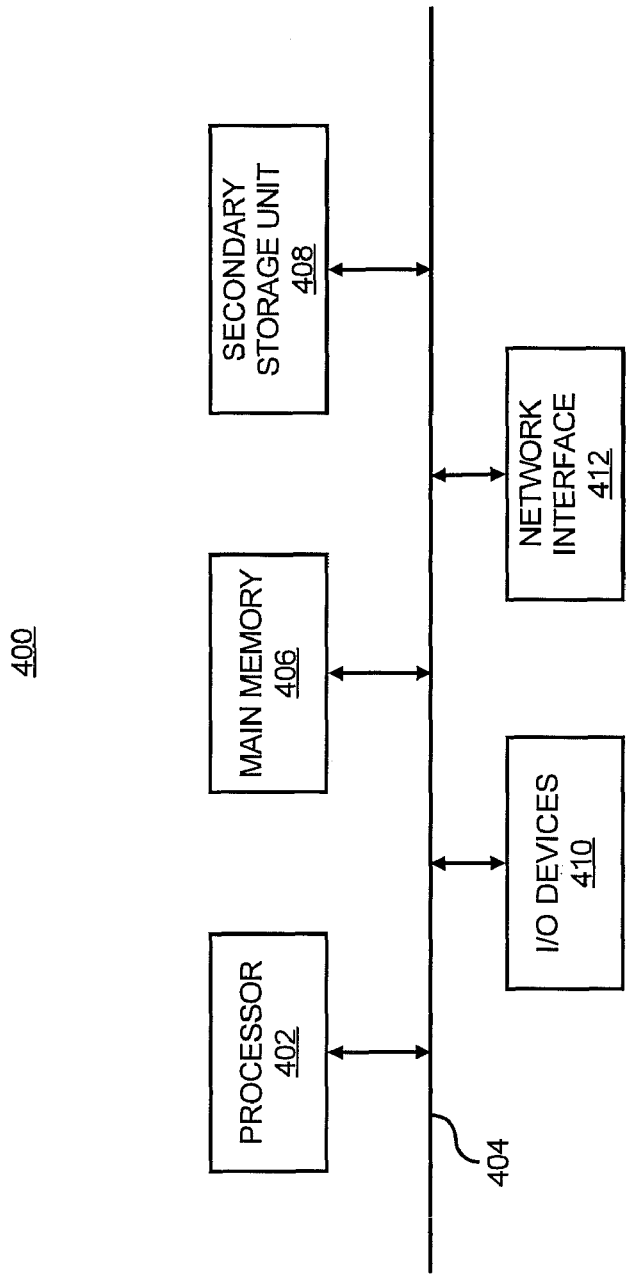
FIG. 4 illustrates a computer system that may be used for the methods and system, according to an embodiment.

FIG. 4 shows a computer system 400 that may be used with the embodiments described herein. The computer system 400 represents a generic platform that includes components that may be in a server or other computer system. The computer system 400 may be used as a platform for the tax return evaluation system 100 and the tax computer 110 shown in FIG. 1, and represents a computer system configured to execute one or more of the methods, functions and other steps described herein. These steps may be embodied as software stored on one or more computer readable mediums.

The tax return evaluation system 100 may also be provided as an enterprise system executed on multiple computer systems, such as multiple servers. For example, if the tax return evaluation system 100 may include an application server and a database server. Also, the tax return evaluation system 100 may include a web server handling requests from the tax agencies 101a-n to evaluate tax returns.

The computer system 400 includes one or more processors 402 that may implement or execute software instructions performing some or all of the methods, functions and other steps described herein. Commands and data from the processor 402 are communicated over a communication bus 404. The computer system 400 also includes a main memory 406, such as a random access memory (RAM), where the software and data for processor 402 may reside during runtime, and a secondary data storage 408, which may be non-volatile and stores software and data. The memory and secondary data storage are examples of computer readable mediums.

The computer system 400 may include one or more I/O devices 410, such as a keyboard, a mouse, a display, etc. The computer system 400 may include a network interface 412 for connecting to a network. It will be apparent to one of ordinary skill in the art that other known electronic components may be added or substituted in the computer system 400.

One or more of the steps of the methods described herein and other steps described herein and one or more of the components of the systems described herein may be implemented as computer code stored on a computer readable medium, such as the memory and/or secondary storage, and executed on a computer system, for example, by a processor, application-specific integrated circuit (ASIC), or other controller. The code may exist as software program(s) comprised of program instructions in source code, object code, executable code or other formats. Examples of computer readable medium include conventional computer system RAM (random access memory), ROM (read only memory), EPROM (erasable, programmable ROM), EEPROM (electrically erasable, programmable ROM), hard drives, and flash memory.

While the embodiments have been described with reference to examples, those skilled in the art will be able to make various modifications to the described embodiments without departing from the scope of the claimed embodiments. Furthermore, the embodiments described herein may be used in combination with each other.

What is claimed is:

1. A computer readable storage medium including computer code that when executed by a processor performs a method of evaluating a tax return, the method comprising:
receiving a plurality of data fields from a tax return;
comparing values for at least some of the plurality of data fields from the tax return with values for factors in a trend profile corresponding to the at least some of the plurality of data fields;
determining the tax return falls within a trend from the comparing;
using a trend score modifier to determine a score for the tax return based on the tax return falling within the trend; and
generating an evaluation of the tax return based on the score.

2. The computer readable storage medium of claim 1, wherein each of the factors in the trend profile identifies a data field in the tax return that is considered relevant to an objective of the evaluation.

3. The computer readable storage medium of claim 2, wherein the objective is to identify fraudulent tax returns or misreportings in tax returns.

4. The computer readable storage medium of claim 1, wherein the method comprises:

determining the tax return is fraudulent or misreported in response to the determining the tax return falls within the trend.

5. The computer readable storage medium of claim 1, wherein the method comprises:
determining whether values in data fields in the tax return match information from one or more data sources other than a tax agency, wherein the information is indicative of a fraudulent tax return.

6. The computer readable storage medium of claim 1, wherein comparing values for at least some of the plurality of data fields from the tax return with values for factors in a trend profile corresponding to the at least some of the plurality of data fields comprises:
identifying the at least some of the plurality of data fields from the plurality of data fields from the tax return that correspond to the factors in the trend profile; and
determining a score for each of the corresponding data fields in the tax return based on the comparisons of the values for the factors in the trend profile to the values in the corresponding data fields in the tax return, wherein each score represents a weighting of the factor for the corresponding data field, wherein the score for the tax return is determined from the scores for the corresponding data fields.

7. The computer readable storage medium of claim 1, wherein determining the tax return falls within a trend comprises:
determining whether the values for the at least some of the plurality of data fields from the tax return match the values for factors in the trend profile corresponding to the at least some of the plurality of data fields; and
in response to determining the values for the at least some of the plurality of data fields match the values for the corresponding factors, determining the tax return falls within the trend.

8. The computer readable storage medium of claim 1, wherein the method comprises reporting the score to a tax agency.

9. The computer readable storage medium of claim 1, wherein determining the tax return falls within a trend comprises:
determining the values for a majority of the factors match the values for the corresponding data fields in the tax return that correspond with the majority of the factors.

10. The computer readable storage medium of claim 1, wherein determining the tax return falls within a trend comprises:
determining values for all the factors match the values for the corresponding data fields in the tax return.

11. The computer readable storage medium of claim 1, comprising:
determining the trend profile by identifying factors from tax returns determined to highly likely be fraudulent; and
storing the trend profile, wherein the trend profile includes the factors from tax returns determined to highly likely be fraudulent.

12. A tax return evaluation system comprising:
a database storing a trend profile from a tax agency, the trend profile including factors for evaluating tax returns;
a computer system to
receive a plurality of data fields from a tax return,
compare values for at least some of the plurality of data fields from the tax return with values for the factors in the stored trend profile corresponding to the at least some of the plurality of data fields,
determine the tax return falls within a trend from the comparing,
using a trend score modifier to determine a score for the tax return, and
generate an evaluation of the tax return based on the score.

13. The tax return evaluation system of claim 12, wherein the computer system determining a tax return falls within the trend comprises:
determining if the values for the data fields match the values for the factors in the stored trend profile;
in response to determining the values match, the computer system determines the tax return falls within the trend.

14. The tax return evaluation system of claim 12, wherein the evaluation is indicative of a likelihood of fraud for each tax return.

15. The tax return evaluation system of claim 12, wherein the score is calculated by determining a score for each factor in the stored trend profile based on a value for the corresponding data field and each score represents a weighting of the factor for the corresponding data field, and combining the scores to determine the score for the tax return.

16. The tax return evaluation system of claim 12, wherein the computer system comprises a web server configured to receive tax returns from the tax agency via the Internet and report the evaluation to the tax agency sending the tax return.

17. The tax return evaluation system of claim 12, wherein the computer system is connected to a plurality of data sources, and the data sources provide information for determining the evaluation of each tax return.

18. A method of evaluating tax returns comprising:
receiving a plurality of data fields from a tax return;
comparing values for at least some of the plurality of data fields from the tax return with values for factors in a trend profile corresponding to the at least some of the plurality of data fields;
determining the tax return falls within a trend from the comparing;
using a trend score modifier to determine a score for the tax return; and
generating, by a computer system, an evaluation of the tax return based on the score.

\* \* \* \* \*